(12) United States Patent
Guan

(10) Patent No.: US 9,319,199 B2
(45) Date of Patent: Apr. 19, 2016

(54) METHOD AND APPARATUS FOR SCHEDULING PDSCHS OF MULTIPLE SUBFRAMES, BASE STATION, AND USER EQUIPMENT

(71) Applicant: Huawei Technologies Co., Ltd., Shenzhen (CN)

(72) Inventor: Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/311,121

(22) Filed: Jun. 20, 2014

(65) Prior Publication Data

US 2014/0321382 A1     Oct. 30, 2014

Related U.S. Application Data

(63) Continuation of application No. PCT/CN2012/087214, filed on Dec. 22, 2012.

(30) Foreign Application Priority Data

Dec. 23, 2011  (CN) .......................... 2011 1 0439496

(51) Int. Cl.
*H04L 5/00* (2006.01)
*H04W 72/12* (2009.01)
(Continued)

(52) U.S. Cl.
CPC ............ *H04L 5/0055* (2013.01); *H04L 1/1861* (2013.01); *H04W 72/0406* (2013.01); *H04W 72/1289* (2013.01); *H04L 1/1896* (2013.01)

(58) Field of Classification Search
None
See application file for complete search history.

(56) References Cited

U.S. PATENT DOCUMENTS

2009/0219897 A1\* 9/2009 Pajukoski ............. H04L 1/1671
370/336

2009/0300456 A1\* 12/2009 Pelletier ................ H04L 1/1812
714/749

(Continued)

FOREIGN PATENT DOCUMENTS

| CN | 101971681 | 2/2011 |
| CN | 102202408 | 9/2011 |

(Continued)

OTHER PUBLICATIONS

Panasonic, "Discussion on PUCCH resource allocation for EPDCCH for TDD," 3GPP TSG-RAN WG1 Meeting #71, R1-124788, Nov. 12-16, 2012, New Orleans, Louisiana, 6 pages.

(Continued)

*Primary Examiner* — Hong Cho
(74) *Attorney, Agent, or Firm* — Slater & Matsil, L.L.P.

(57) ABSTRACT

Embodiments of the present invention provide a communication method, a base station, and a user equipment. The communication method includes: sending a PDCCH to a user equipment in one subframe, where the PDCCH is used to schedule transmission of PDSCHs of at least two subframes of the user equipment, the PDCCH carries first indicator information, and the first indicator information indicates a channel resource for transmitting uplink ACK/NACK information that is corresponding to the PDSCHs; determining a transmission subframe carrying the uplink ACK/NACK information that is corresponding to the PDSCHs, and receiving the uplink ACK/NACK information on the channel resource in the transmission subframe. In the embodiments of the present invention, when a PDCCH schedules multiple PDSCHs, an ACK/NACK resource indicator field is used to indicate a channel resource of ACK/NACK feedback that is corresponding to the scheduled PDSCHs, thereby improving scheduling flexibility.

20 Claims, 5 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2011/0286436 A1 | 11/2011 | Suzuki et al. | |
| 2012/0127938 A1 | 5/2012 | Lv et al. | |
| 2013/0016686 A1 | 1/2013 | Li et al. | |
| 2013/0223298 A1* | 8/2013 | Ahn | H04B 7/2643 370/280 |
| 2013/0272261 A1* | 10/2013 | Seo | H04J 11/0056 370/329 |
| 2013/0322304 A1* | 12/2013 | Yang | H04W 72/042 370/280 |
| 2014/0044084 A1* | 2/2014 | Lee | H04L 1/1861 370/329 |
| 2014/0293909 A1 | 10/2014 | Xu et al. | |

FOREIGN PATENT DOCUMENTS

| | | |
|---|---|---|
| CN | 102271032 | 12/2011 |
| EP | 2538734 | 3/2011 |
| EP | 2723122 | 4/2014 |
| WO | 2011116680 | 9/2011 |

OTHER PUBLICATIONS

Pantech, "PUCCH resource allocation with SORTD in Rel-10 CA," 3GPP TSG RAN1 #63bis, R1-110156, Jan. 17-21, 2011, Dublin, Ireland, 5 pages.

* cited by examiner

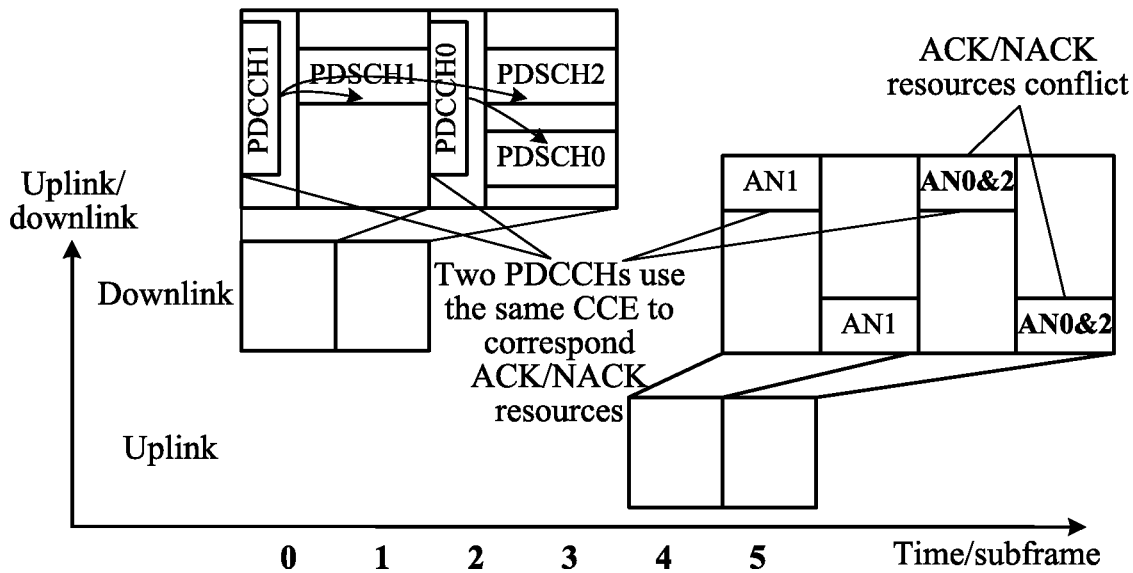

FIG. 1

Send a PDCCH to a user equipment in one subframe. The PDCCH is used to schedule transmission of PDSCHs of at least two subframes of the user equipment, and the PDCCH carries first indicator information. The first indicator information indicates a channel resource for transmitting uplink ACK/NACK information that is corresponding to the PDSCHs. ⟶ 201

Determine a transmission subframe carrying the uplink ACK/NACK information that is corresponding to the PDSCHs, and receive the uplink ACK/NACK information on the channel resource in the transmission subframe. ⟶ 202

FIG. 2

METHOD AND APPARATUS FOR SCHEDULING PDSCHS OF MULTIPLE SUBFRAMES, BASE STATION, AND USER EQUIPMENT

This application is a continuation of International Application No. PCT/CN2012/087214, filed on Dec. 22, 2012, which claims priority to Chinese Patent Application No. 201110439496.9, filed on Dec. 23, 2011, both of which are hereby incorporated by reference in their entireties.

TECHNICAL FIELD

Embodiments of the present invention relate to the field of wireless communications, and in particular, to a communication method, a base station, and a user equipment.

BACKGROUND

In an LTE (long term evolution) system, a minimum time interval for a base station (for example, eNB, Evolved NodeB) to schedule a user equipment (UE) is one subframe. For a UE that is scheduled in a subframe, a physical downlink control channel (PDCCH) of the UE is included in the subframe. A PDCCH may be a downlink scheduling grant (DL_grant) or an uplink scheduling grant (UL_grant). DL_grant or UL_grant sent by an eNB respectively carries scheduling information indicating a physical downlink shared channel (PDSCH) or scheduling information indicating a physical uplink shared channel (PUSCH). A PUSCH and a PDSCH may be considered as uplink and downlink data channels.

In an existing LTE system, one PDCCH can schedule PDSCH data of only one subframe. Specifically, a PDCCH and a scheduled PDSCH are located in the same subframe. For a frequency division duplexing (FDD) system, a UE feeds back uplink ACK/NACK (acknowledgement/non-acknowledgement) information corresponding to the PDSCH in a fourth subframe after this subframe, and for a TDD system, the UE feeds back uplink ACK/NACK information corresponding to the PDSCH in at least the fourth subframe after this subframe or later. The uplink ACK/NACK information may also be referred to as uplink feedback information in the following. A specific sequence of feedback is pre-configured, and a channel resource of the ACK/NACK is corresponding to a label of a control channel element (CCE) occupied by the PDCCH.

If the UE feeds back NACK, the eNB subsequently schedules a retransmission packet for the UE by using the PDCCH. The PDCCH carries new data indicator (NDI) information occupying one bit, so as to indicate whether a currently scheduled data packet is a new packet or an old packet. Specifically, if a value of an NDI bit is inconsistent with a previous NDI value, it indicates that the packet is a new packet; and if the value of the NDI bit is consistent with the previous NDI value, it indicates that the packet is an old packet. The PDCCH also carries a redundancy version (RV) number occupying two bits, which indicates four different versions.

In an LTE system of a subsequent evolved version, to improve scheduling efficiency of a PDCCH and reduce an overhead of the PDCCH, multi-subframe scheduling of the PDCCH is introduced, that is, one PDCCH may schedule PDSCHs of multiple subframes. In this case, multiple PDSCHs that are scheduled by one PDCCH each need to perform corresponding ACK/NACK feedback, and a current manner of determining a channel resource of the ACK/NACK feedback is no longer applicable.

SUMMARY

Embodiments of the present invention provide a communication method, a base station, and a user equipment, so that a channel resource of ACK/NACK feedback that is corresponding to multiple PDSCHs can be determined.

In one aspect, a communication method is provided and includes sending a physical downlink control channel (PDCCH) to a user equipment in one subframe, where the PDCCH is used to schedule transmission of physical downlink shared channels (PDSCH) of at least two subframes of the user equipment. The PDCCH carries first indicator information, and the first indicator information indicates a channel resource for transmitting uplink acknowledgment/non-acknowledgment (ACK/NACK) information that is corresponding to the PDSCHs. A transmission subframe carrying the uplink ACK/NACK information that is corresponding to the PDSCHs is determined, and the uplink ACK/NACK information on the channel resource in the transmission subframe is received.

In another aspect, a communication method is provided and includes receiving in one subframe a physical downlink control channel (PDCCH) sent by a base station, where the PDCCH is used to schedule transmission of physical downlink shared channels (PDSCH) of at least two subframes of a user equipment. The PDCCH carries first indicator information, and the first indicator information indicates a channel resource for transmitting uplink acknowledgment/non-acknowledgment (ACK/NACK) information that is corresponding to the PDSCHs. A transmission subframe carrying the uplink ACK/NACK information that is corresponding to the PDSCHs is determined, and the uplink ACK/NACK information on the channel resource in the transmission subframe is sent.

In another aspect, a base station is provided and includes a channel sending unit, configured to send a physical downlink control channel (PDCCH) to a user equipment in one subframe, where the PDCCH is used to schedule transmission of physical downlink shared channels (PDSCH) of at least two subframes of the user equipment, the PDCCH carries first indicator information. The first indicator information indicates a channel resource for transmitting uplink acknowledgment/non-acknowledgment (ACK/NACK) information that is corresponding to the PDSCHs. An information receiving unit is configured to determine a transmission subframe carrying the uplink ACK/NACK information that is corresponding to the PDSCHs, and receive the uplink ACK/NACK information on the channel resource in the transmission subframe.

In another aspect, a user equipment is provided and includes a channel receiving unit configured to receive in one subframe a physical downlink control channel (PDCCH) sent by a base station. The PDCCH is used to schedule transmission of physical downlink shared channels (PDSCH) of at least two subframes of the user equipment. The PDCCH carries first indicator information, and the first indicator information indicates a channel resource for transmitting uplink acknowledgment/non-acknowledgment (ACK/NACK) information that is corresponding to the PDSCHs. An information sending unit is configured to determine a transmission subframe carrying the uplink ACK/NACK information that is corresponding to the PDSCHs, and send the uplink ACK/NACK information on the channel resource in the transmission subframe.

In embodiments of the present invention, when a PDCCH schedules multiple PDSCHs, indicator information is carried in the PDCCH to indicate a channel resource of ACK/NACK feedback that is corresponding to the scheduled PDSCHs, so that the channel resource of the ACK/NACK feedback that is corresponding to the multiple PDSCHs can be determined.

BRIEF DESCRIPTION OF THE DRAWINGS

To describe the technical solutions in the embodiments of the present invention more clearly, the accompanying drawings required for describing the embodiments are introduced briefly in the following. Apparently, the accompanying drawings in the following description show only some embodiments of the present invention, and persons of ordinary skill in the art can also derive other drawings from these accompanying drawings without creative efforts.

FIG. 1 is a schematic diagram of an example that a PDCCH schedules PDSCHs of multiple subframes;

FIG. 2 is a flow chart of a communication method according to an embodiment of the present invention;

DETAILED DESCRIPTION OF ILLUSTRATIVE EMBODIMENTS

Figure 3:
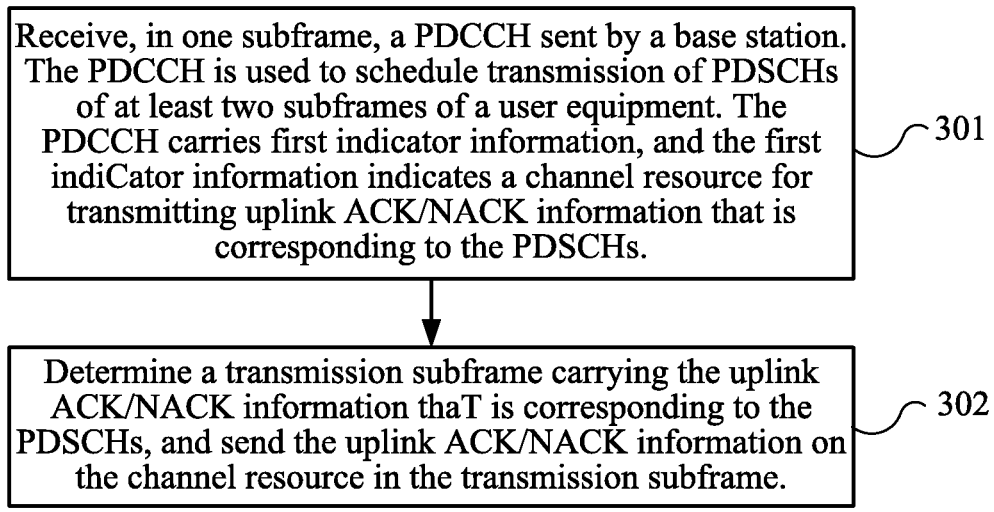
FIG. 3 is a flow chart of a communication method according to another embodiment of the present invention.

The technical solutions in the embodiments of the present invention are clearly described in the following with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

The technical solutions of the present invention are applicable to various communication systems, for example, a GSM, a code division multiple access (CDMA) system, a wideband code division multiple access (WCDMA) system, a general packet radio service (GPRS) system, and a long term evolution (LTE) system.

A user equipment (UE) may also be referred to as a mobile terminal, a mobile user equipment, and the like, and may communicate with one or more core networks through a radio access network (for example, RAN). The user equipment may be a mobile terminal, such as a mobile phone (or referred to as a "cellular" phone) and a computer having a mobile terminal, for example, which may be a portable mobile device, a pocket mobile device, a handheld mobile device, a mobile device built in a computer, or a vehicle-mounted mobile device, and exchanges language and/or data with the radio access network.

A base station may be a base station (for example, BTS, Base Transceiver Station) in the GSM or CDMA, may also be a base station (for example, NodeB) in the WCDMA, or an evolved base station (for example, eNB or e-NodeB, evolutional Node B) in the LTE, which is not limited in the present invention. However, to facilitate description, a Node B is taken as an example for description in the following embodiments.

In a case that one PDCCH schedules PDSCHs of multiple subframes, a channel resource of ACK/NACK feedback that is corresponding to the multiple PDSCHs needs to be determined.

An existing solution is that a label of a control channel element occupied by a PDCCH scheduling multiple subframes is used for corresponding, but the solution brings a scheduling limitation on the PDCCH. FIG. 1 is a schematic diagram of an example in which a PDCCH schedules PDSCHs of multiple subframes.

As shown in FIG. 1, in a subframe 0, a base station schedules two PDSCHs (a PDSCH1 and a PDSCH2) of the subframe 0 and a subframe 1 by using a PDCCH1. In the subframe 1, the base station schedules a PDSCH0 of the subframe 1 by using a PDCCH0. It can be seen from an ACK/NACK feedback sequence relation that, an ACK/NACK (AN1) corresponding to the PDSCH1 is fed back in a subframe 4, and ACK/NACKs (AN0 and AN2) corresponding to the PDSCH2 and PDSCH0 are fed back in a subframe 5. If the two PDCCHs occupy the same CCE label, channel resources of the AN0 and AN2 in the subframe 5 conflict, and in this way, an eNB cannot use the same CCE label to schedule the two PDCCHs, thereby bringing in a scheduling limitation on a scheduler. Therefore, the solution shown in FIG. 1 reduces scheduling flexibility of a PDCCH.

FIG. 2 is a flow chart of a communication method according to an embodiment of the present invention. The method shown in FIG. 2 is executed by a base station.

In step 201 a PDCCH is sent to a user equipment in one subframe. The PDCCH is used to schedule transmission of PDSCHs of at least two subframes of the user equipment, and the PDCCH carries first indicator information. The first indicator information indicates a channel resource for transmitting uplink ACK/NACK information that is corresponding to the PDSCHs.

Optionally, the PDSCH may adopt a pre-configured Redundant Version (RV). As an embodiment, the PDCCH may be used to schedule transmission of primary transmission PDSCHs of at least two subframes of the user equipment. Each subframe is corresponding to at least one primary transmission PDSCH. A pre-configured RV adopted by the primary transmission PDSCH may be pre-defined, that is, the base station and the user equipment do not need to interact with each other; or a pre-configured RV adopted by the primary transmission PDSCH may be determined by the base station, and then the base station notifies the user equipment of the pre-configured RV, for example, the base station may notify the user equipment of the pre-configured RV through RRC (radio resource control) signaling. A manner of notifying the pre-configured RV is not limited in the embodiment of the present invention.

Optionally, as another embodiment, the PDCCH may carry a subframe indicator field (SIF) information, where the SIF information is used to indicate the at least two scheduled subframes, so that the user equipment may determine, according to the SIF information carried by the PDCCH, a primary transmission PDSCH of which subframe is scheduled by the PDCCH. Alternatively, the PDCCH may carry SIF information and a new data indicator (NDI) information, where the SIF information and the NDI information are used to jointly indicate the at least two scheduled subframes, so that the user equipment may determine comprehensively, according to the SIF information and NDI that are carried by the PDCCH, a primary transmission PDSCH of which subframe is scheduled by the PDCCH. Various examples of a manner of indicating a scheduled subframe are described in detail through specific embodiments in the following.

Optionally, as another embodiment, first indicator information of a channel resource of uplink ACK/NACK information that is corresponding to a PDSCH, in the PDSCHs, that is in the same subframe as the PDCCH may be a control channel element (CCE) label of the PDCCH. First indicator information of a channel resource of uplink ACK/NACK information that is corresponding to a PDSCH, in the PDSCHs, that is not in the same subframe as the PDCCH may be an ACK/NACK resource indicator (ARI) in the PDCCH.

Optionally, as another embodiment, first indicator information of a channel resource of uplink ACK/NACK information that is corresponding to a PDSCH may be an ARI in a PDCCH.

Optionally, the ARI may be a specified bit or a scrambling code in the PDCCH. For example, the specified bit may be all or part of bits in the RV, and/or one bit in the NDI, and/or all or part of bits in a downlink assignment index (DAI). Various examples of indicating the first indicator information are described in detail through specific embodiments in the following.

In step 202 a transmission subframe carrying the uplink ACK/NACK information that is corresponding to the PDSCHs is determined, and the uplink ACK/NACK information on the channel resource in the transmission subframe is received.

A manner of determining the transmission subframe is not limited in the embodiment of the present invention, for example, any existing determining manner may be adopted. For example, an $i^{th}$ ($i$=4, 5, 6, and the like) subframe after a subframe in which a PDSCH is located may be used as the transmission subframe. Alternatively, another manner may be adopted, for example, uplink feedback information of all scheduled PDSCHs may be fed back to the base station in a fixed transmission subframe.

After the transmission subframe is determined, the uplink feedback information may be received on a corresponding channel resource in the transmission subframe (that is, the channel resource indicated by the first indicator information in step 201).

Therefore, in the embodiment of the present invention, when a PDCCH schedules multiple PDSCHs, indicator information is carried in the PDCCH to indicate a channel resource of ACK/NACK feedback that is corresponding to the scheduled PDSCHs, so that the channel resource of the ACK/NACK feedback that is corresponding to the multiple PDSCHs can be determined.

In addition, in this embodiment, when a PDCCH schedules multiple PDSCHs, an ACK/NACK resource indicator field may be used to indicate a channel resource of ACK/NACK feedback that is corresponding to the scheduled PDSCHs, and a subframe indicator field may further be introduced to specifically identify the number of scheduled subframes, so that a redundancy version field and/or new data indicator field may be used as the ACK/NACK resource indicator, thereby improving scheduling flexibility.

In addition, for a retransmission PDSCH, the PDCCH may further be used to schedule transmission of a retransmission PDSCH of one or more subframes of the user equipment. In this case, the PDCCH may carry second indicator information used to indicate a channel resource for transmitting uplink ACK/NACK information that is corresponding to the retransmission PDSCH. For example, the second indicator information may be the CCE label or ARI of the PDCCH, or may reuse the first indicator information.

In addition, in order to indicate a subframe in which a PDSCH needs to be retransmitted, the PDCCH may carry NDI information, where the NDI information is used to indicate the one or more scheduled subframes (that is, the subframe in which the PDSCH needs to be retransmitted), so that the user equipment may determine, according to the NDI information carried by the PDCCH, a retransmission PDSCH of which subframe is scheduled by the PDCCH. Alternatively, the PDCCH may carry SIF information and NDI information, where the SIF information and the NDI information are used to jointly indicate the one or more scheduled subframes, so that the user equipment may determine comprehensively, according to the SIF information and the NDI information that are carried by the PDCCH, a retransmission PDSCH of which subframe is scheduled by the PDCCH. Various examples of a manner of indicating a scheduled subframe are described in detail through specific embodiments in the following.

FIG. 3 is a flow chart of a communication method according to another embodiment of the present invention. The method shown in FIG. 3 is executed by a user equipment, and is corresponding to the method shown in FIG. 2, and therefore, repeated descriptions are omitted properly.

In step 301 a PDCCH sent by a base station is received in one subframe. The PDCCH is used to schedule transmission of PDSCHs of at least two subframes of a user equipment. The PDCCH carries first indicator information, and the first indicator information indicates a channel resource for transmitting uplink ACK/NACK information that is corresponding to the PDSCHs.

Optionally, the PDSCH may adopt a pre-configured RV. As an embodiment, the PDCCH may be used to schedule transmission of primary transmission PDSCHs of at least two subframes of the user equipment. Each subframe is corresponding to at least one primary transmission PDSCH. A pre-configured RV adopted by the primary transmission PDSCH may be pre-defined, that is, the base station and the user equipment do not need to interact with each other; or a pre-configured RV adopted by the primary transmission PDSCH may be determined by the base station, and then the user equipment receives a notification of the base station about the pre-configured RV, for example, the base station may notify the user equipment of the pre-configured RV through RRC (radio resource control) signaling. A manner of notifying the pre-configured RV is not limited in the embodiment of the present invention.

Optionally, as another embodiment, the PDCCH may carry SIF information, where the SIF information is used to indicate the at least two scheduled subframes, so that the user equipment may determine, according to the SIF information carried by the PDCCH, a primary transmission PDSCH of which subframe is scheduled by the PDCCH. Alternatively, the PDCCH may carry SIF information and NDI information, where the SIF information and the NDI information are used to jointly indicate the at least two scheduled subframes, so that the user equipment may determine comprehensively, according to the SIF information and NDI that are carried by the PDCCH, a primary transmission PDSCH of which subframe is scheduled by the PDCCH. Various examples of a manner of indicating a scheduled subframe are described in detail through specific embodiments in the following.

Optionally, as another embodiment, first indicator information of a channel resource of uplink ACK/NACK information that is corresponding to a PDSCH, in the PDSCHs, that is in the same subframe as the PDCCH may be a CCE label of the PDCCH; and first indicator information of a channel resource of uplink ACK/NACK information that is corresponding to a PDSCH, in the PDSCHs, that is not in the same subframe as the PDCCH may be an ARI in the PDCCH.

Optionally, as another embodiment, first indicator information of a channel resource of uplink ACK/NACK information that is corresponding to a PDSCH may be an ARI in a PDCCH.

Optionally, the ARI may be a specified bit or a scrambling code in the PDCCH. For example, the specified bit may be all or part of bits in the RV, and/or one bit in the NDI, and/or all or part of bits in a DAI. Various examples of indicating the first indicator information are described in detail through specific embodiments in the following.

In step 302 a transmission subframe carrying the uplink ACK/NACK information that is corresponding to the PDSCHs is determined, and the uplink ACK/NACK information on the channel resource in the transmission subframe is sent.

A manner of determining the transmission subframe is not limited in the embodiment of the present invention, for example, any existing determining manner may be adopted. For example, an $i^{th}$ (i=4, 5, 6, and the like) subframe after a subframe in which a PDSCH is located may be used as the transmission subframe. Alternatively, another manner may be adopted, for example, uplink feedback information of all scheduled PDSCHs may be fed back to the base station in a fixed transmission subframe.

After the transmission subframe is determined, the uplink feedback information may be sent on a corresponding channel resource in the transmission subframe (that is, the channel resource indicated by the first indicator information in step 301).

Therefore, in the embodiment of the present invention, when a PDCCH schedules multiple PDSCHs, indicator information is carried in the PDCCH to indicate a channel resource of ACK/NACK feedback that is corresponding to the scheduled PDSCHs, so that the channel resource of the ACK/NACK feedback that is corresponding to the multiple PDSCHs can be determined.

In addition, for a retransmission PDSCH, the PDCCH may further be used to schedule transmission of a retransmission PDSCH of one or more subframes of the user equipment. In this case, the PDCCH may carry second indicator information used to indicate a channel resource for transmitting uplink ACK/NACK information that is corresponding to the retransmission PDSCH. For example, the second indicator information may be the CCE label or ARI of the PDCCH, or may reuse the first indicator information.

In addition, in order to indicate a subframe in which a PDSCH needs to be retransmitted, the PDCCH may carry NDI information, where the NDI information is used to indicate the one or more scheduled subframes (that is, the subframe in which the PDSCH needs to be retransmitted), so that the user equipment may determine, according to the NDI information carried by the PDCCH, a retransmission PDSCH of which subframe is scheduled by the PDCCH. Alternatively, the PDCCH may carry SIF information and NDI information, where the SIF information and the NDI information are used to jointly indicate the one or more scheduled subframes, so that the user equipment may determine comprehensively, according to the SIF information and the NDI information that are carried by the PDCCH, a retransmission PDSCH of which subframe is scheduled by the PDCCH. Various examples of a manner of indicating a scheduled subframe are described in detail through specific embodiments in the following.

The embodiments of the present invention are described in further detail through specific examples in the following. However, it should be noted that the examples in the following are only exemplary, but are not intended to limit the scope of the present invention. For example, in the following examples an ARI is represented by reusing 2 bits of an existing RV in a PDCCH. However, the embodiment of the present invention may adopt an ARI in another form, for example, which may be in a scrambling code form, or adopt a newly added bit, or adopt a bit of another information element (for example, an NDI or an DAI), or adopt part of bits in the RV (for example, a previous bit or a next bit), or adopt a combination of the foregoing manners. The modifications all fall within the scope of the present invention.

In addition, to clearly describe the embodiments the following embodiments are numbered. However, it does not intend to limit implementation forms of the present invention. For example, some elements of the embodiments having different numbers may be used in combination without being limited to a specific implementation manner of an embodiment where an element is located. Such use in combination also falls within the scope of the present invention.

Embodiment 1

In Embodiment 1, multi-subframe scheduling may be performed for only primary transmission, and a retransmission packet supports only single-subframe scheduling; and primary transmission of multi-subframe scheduling is determined by a SIF, and retransmission is determined by a SIF and an NDI.

A base station sends one PDCCH to a UE in a subframe n, where the PDCCH schedules PDSCH primary transmission packets of N subframes of the UE. For example, N may specifically be 1, 2, 3, or 4, but a value of N does not limit the scope of the present invention.

In this case, a SIF of two bits may be added in the PDCCH for indication. Specifically, when the SIF is '00', '01', '10', and '11', it indicates that PDSCHs of subframes {n}, {n, n+1}, {n, n+1, n+2}, {n, n+1, n+2, n+3} are scheduled, that is, in this case, the SIF that is not equal to '00' indicates scheduling primary transmission packets of multiple subframes. For example, N=3 is taken as an example, and primary transmission packets of three subframes {n, n+1, n+2} are scheduled. In this case, the three PDSCH primary transmission packets adopt a pre-configured RV, for example, RV=0 or 3, or adopt an RV that is notified by the base station through RRC signaling, so that the UE receives the PDSCHs according to the RV.

Determining of an ACK/NACK channel resource corresponding to the PDSCHs may be described in the terms of an FDD system and a TDD system.

For the FDD system:

(1) It is assumed that, in the FDD system, each PDSCH corresponds to one ACK/NACK, and an ACK/NACK feedback sequence remains unchanged, that is, being delayed by 4 subframes (i=4) with respect to its corresponding PDSCH, and an ACK/NACK corresponding to a PDSCH of a subframe n is fed back in a subframe n+4. Likewise, ACK/NACKs corresponding to PDSCHs of subframes n+1 and n+2 are fed back in subframes n+5 and n+6 respectively. Therefore, an ACK/NACK channel resource corresponding to a PDSCH in the subframe in which the PDCCH is located is corresponding to a CCE label of the PDCCH. That is, an ACK/NACK channel resource corresponding to the PDSCH of the subframe n is implicitly corresponding to the CCE label of the PDCCH. Further, if the PDCCH is sent in a PDSCH area in a pre-coding manner, the ACK/NACK channel resource corresponding to the PDSCH in the subframe in which the PDCCH is located may also be determined through an RB or an RB pair of the PDCCH or a label of an antenna port. An ACK/NACK channel resource corresponding to a PDSCH in a subframe in which the PDCCH is not located is notified by an ARI in the PDCCH. That is, ACK/NACK channel resources corresponding to the subframes n+1 and n+2 are displayed and notified by the ARI in the PDCCH, where the ARI may be newly added two bits or newly added scrambling codes, or may reuse two bits of the RV, or may reuse another existing bit. Optionally, the ACK/NACK channel resources corresponding to the subframes n+1 and n+2 are the same channel resource on different subframes (n+5 and n+6).

(2) It is assumed that, in the FDD system, multiple PDSCHs are corresponding to one ACK/NACK, that is, the ACK/NACK is bound in a time domain, and in this case, a feedback subframe of the ACK/NACK is n+6. That is, an original ACK/NACK sequence corresponding to a last PDSCH is used as a reference. Alternatively, ACK/NACKs corresponding to the multiple PDSCHs are not bound, but are transmitted separately, and feedback subframes of the ACK/NACKs are all n+6. Channel resources of the ACK/NACKs are notified through an ARI in the PDCCH, where the ARI may be newly added two bits or newly added scrambling codes, or may reuse two bits of an RV, or may reuse another existing bit.

(3) It is assumed that, in the FDD system, a channel resource of an ACK/NACK corresponding to a PDSCH in a subframe in which the PDCCH is located is determined according to a CCE label of the PDCCH, and an original feedback sequence is adopted. That is, an ACK/NACK corresponding to a PDSCH of a subframe n is fed back in a subframe n+4. An ACK/NACK corresponding to a PDSCH in a subframe in which the PDCCH is not located adopts an ACK/NACK binding manner or is transmitted separately without being bound, and its feedback sequence is an original ACK/NACK sequence corresponding to a last PDSCH, that is, n+6. In other words, ACK/NACKs corresponding to PDSCHs of subframes n+1 and n+2 are bound in a time domain and then are fed back in a subframe n+6, and their channel resources are notified through an ARI in the PDCCH, where the ARI may be newly added two bits or newly added scrambling codes, or may reuse two bits of an RV, or may reuse another existing bit.

For the TDD system, it is assumed that a TDD uplink and downlink configuration 2 (as shown in Table 1) is adopted, where subframes 2 and 7 are uplink subframes, and the remaining 8 subframes are downlink subframes. For an ACK/NACK feedback sequence, ACK/NACKs of downlink subframes 4, 5, 6, and 8 are all fed back in the uplink subframe 2, and ACK/NACKs of the remaining downlink subframes are all fed back in the other uplink subframe.

TABLE 1

| | | | Subframe number | | | | | | |
|---|---|---|---|---|---|---|---|---|---|
| 0 | 1 | 2 (uplink) | 3 | 4 | 5 | 6 | 7 (uplink) | 8 | 9 |
| Uplink and downlink configuration 2 | — | — | 4, 5, 6, 8 | — | — | — | — | 9, 0, 1, 3 | — | — |

(1) It is assumed that, in the TDD system, an ACK/NACK adopts a time domain binding mode. In an embodiment, a PDCCH sent by a subframe 4 schedules PDSCH primary transmission packets of two subframes 4 and 5, and a PDCCH sent by a subframe 6 schedules PDSCH primary transmission packets of two subframes 6 and 8. In this case, ACK/NACK channel resources corresponding to PDSCHs of the subframe 4 and the subframe 6 are determined separately through CCE labels of the two PDCCHs, and ACK/NACK channel resources corresponding to PDSCHs of the subframe 5 and the subframe 8 are notified respectively through ARIs in the two PDCCHs. Preferably, ACK/NACK channel resources notified by PDCCHs of different downlink subframes corresponding to an ACK/NACK of the same uplink subframe are not overlapped, or it is described as that ACK/NACK channel resources indicated by different PDCCHs in the same binding window (for example, the binding window of the subframe 2 is subframes 4, 5, 6, and 8) are not overlapped. For example, ACK/NACK channel resources corresponding to the subframe 5 and the subframe 8 are different, so that when missing detection of a PDCCH occurs to a UE, a base station may find the missing detection through blind detection of different ACK/NACKs. However, ACK/NACK resources corresponding to different PDSCHs indicated by the same PDCCH may be the same. For example, ACK/NACK channel resources corresponding to the subframe 4 and the subframe 5 may be the same. In another embodiment, a PDCCH may perform scheduling across multiple binding windows. For example, one PDCCH may schedule three PDSCH primary transmission packets in a subframe 6, a subframe 8 and a subframe 9, and in this case, ACK/NACK channel resources corresponding to downlink subframes in different binding windows may be the same. For example, ACK/NACK channel resources corresponding to the subframe 8 and the subframe 9 may be the same.

(2) It is assumed that, in the TDD system, an ACK/NACK adopts a channel selection mode. In an embodiment, a PDCCH sent by a subframe 4 schedules three PDSCH primary transmission packets of three subframes 4, 5, and 6. In this case, a manner of indicating an ACK/NACK channel resource may specifically include three methods: (a) An ACK/NACK channel resource corresponding to the subframe 4 is determined through a CCE label of the PDCCH, and ACK/NACK channel resources corresponding to the subframe 5 and the subframe 6 are notified through an ARI in the PDCCH, that is, the notified number of ACK/NACK channel resources is the number of PDSCHs in a scheduled non-PDCCH subframe, and two different ACK/NACK resources different from the ACK/NACK channel resource corresponding to the subframe 4 are notified, so that a UE finally sends an ACK/NACK by performing channel selection on the ACK/NACK channel resource; (b) the number of ACK/NACK channel resources directly indicated by the ARI is equal to the number of PDSCHs scheduled by the PDCCH, and the indicated ACK/NACK channel resources are corresponding to the scheduled PDSCHs; and (c) the ARI directly indicates that M ACK/NACK channel resources are corresponding to subframes in the binding window, where M is the number of downlink subframes in the binding window, and the UE sends an ACK/NACK by performing channel selection of M=4 on the notified ACK/NACK channel resources. In another embodiment, a PDCCH may perform scheduling across multiple binding windows. By taking two windows (their sizes are M1 and M2) as an example, it is assumed that a PDCCH sent by a subframe 5 schedules 4 PDSCH primary transmission packets of the subframe 5, a subframe 6, a subframe 8, and a subframe 9, and in this case, a manner of indicating ACK/NACK channel resource may specifically include three methods: (a) an ACK/NACK channel resource corresponding to a PDSCH in a subframe in which the PDCCH is located is determined through a CCE label of the PDCCH, for example, the subframe 5, and an ACK/NACK channel resource corresponding to a PDSCH in a subframe in which the PDCCH is not located is notified through an ARI in the PDCCH, for example, the subframes 6, 8, and 9, and the notified number is the number of PDSCHs in the subframe in which the PDCCH is not located in each window, for the window M1, the notified number of ACK/NACK channel resources is 1, that is, the subframe 6, for the window M2, the notified number of ACK/NACK channel resources is 2, that is, the subframes 8 and 9, where specifically, resources indicated by the ARI are A1 and A2, for the M1 window, the resource A1 is directly taken, and for the M2 window, A1 and A2 are taken; (b) the number of ACK/NACK channel resources directly indicated by the ARI is the number of scheduled PDSCHs in each binding window, and the indicated ACK/NACK channel resources are corresponding to the scheduled PDSCHs, for example, for the M1 window, two notified ACK/NACK channel resources are corresponding to the subframes 5 and 6, for the M2 window, two notified ACK/NACK channel resources are corresponding to the subframes 8 and 9, and the two windows may share one set of ACK/NACK channel resources, but ACK/NACK channel resources in each window are different; and (c) the ARI directly indicates that M1 and M2 ACK/NACK channel resources are corresponding to the subframes in the binding windows, that is, for the M1 window, 4 ACK/NACK channel resources are notified, for the M2 window, 4 ACK/NACK channel resources are notified, the two windows may share one set of ACK/NACK channel resources, but ACK/NACK channel resources in each window are different.

After the ACK/NACK channel resource is determined, a base station determines receiving subframes of ACK/NACKs corresponding to the PDSCHs. For example, the base station notifies a pre-configured sequence relation, and receives the ACK/NACKs corresponding to the PDSCHs in the determined ACK/NACK receiving subframes and on the determined channel resource. Correspondingly, the UE determines sending subframes of the ACK/NACKs corresponding to the PDSCHs. For example, the UE notifies a pre-configured sequence relation, and sends the ACK/NACKs corresponding to the PDSCHs in the determined ACK/NACK sending subframes and on the determined channel resource.

For scheduling of a retransmission packet, in Embodiment 1, only single-subframe scheduling is supported, and a retransmission packet notification is indicated by using a SIF and an NDI. Specifically, when SIF='00', it indicates single-subframe scheduling, and in this case, if the NDI is not turned over with respect to an NDI in a PDCCH of a previous identical progress, it indicates a retransmission packet.

Determining of an ACK/NACK channel resource of a retransmission packet may be specifically classified into the following scenarios:

(1) When a PDCCH scheduling a retransmission packet is in the same subframe as a PDSCH, that is, scheduling in the same subframe, an ACK/NACK channel resource corresponding to the retransmission packet is corresponding preferably according to a CCE label of the PDCCH, or may reuse an ACK/NACK channel resource of a primary transmission packet corresponding to the retransmission packet, or may be determined through an ARI. In this case, two bits of an RV are used as a retransmission RV indicator.

(2) When a PDCCH scheduling a retransmission packet is not in the same subframe as a PDSCH, that is, scheduling across subframes, an ACK/NACK channel resource corresponding to the retransmission packet may preferably reuse an ACK/NACK channel resource of a primary transmission packet corresponding to the retransmission packet, or may be determined according to a CCE label of the PDCCH of the retransmission packet, or may be determined through an ARI. An RV field is used as a real retransmission RV version indicator.

Therefore, in Embodiment 1, an ACK/NACK channel resource corresponding to a PDSCH in a subframe in which a PDCCH is not located may be explicitly indicated through an ARI, thereby reducing a scheduling limitation, and improving scheduling flexibility of a PDCCH. In addition, by reusing a field in an existing PDCCH as an ARI, format design of the PDCCH is also simplified.

Embodiment 2

In Embodiment 2, multi-subframe scheduling may be performed for only primary transmission, and a retransmission packet supports only single-subframe scheduling. Primary transmission of multi-subframe scheduling is determined by a SIF and an NDI, and retransmission is determined by an NDI.

A base station sends one PDCCH to a UE in a subframe n, where the PDCCH schedules PDSCH primary transmission packets of N subframes of the UE. For example, N may specifically be 1, 2, 3, or 4, but a value of N does not limit the scope of the present invention.

In this case, a SIF of two bits may be added in the PDCCH for indication. Specifically, the UE first determines, according to an NDI, whether the PDCCH schedules a primary transmission packet or a retransmission packet, and if the PDCCH schedules a primary transmission packet, the UE determines, according to a value of the SIF, whether the scheduling is single-subframe scheduling or multi-subframe scheduling. For example, when the NDI is turned over, and the SIF is '00', '01', '10', and '11', it indicates that PDSCH primary transmission packets of subframes {n}, {n, n+1}, {n, n+1, n+2}, and {n, n+1, n+2, n+3} are scheduled, that is, in this case, the SIF that is not equal to '00' indicates scheduling primary transmission packets of multiple subframes. For example, N=3 is taken as an example, and primary transmission packets of three subframes {n, n+1, n+2} are scheduled. In this case, the three PDSCH primary transmission packets adopt a pre-configured RV, for example, RV=0 or 3, or adopt an RV that is notified by the base station through RRC signaling, so that the UE receives the PDSCHs according to the RV. Determining and sending of an ACK/NACK channel resource corresponding to the PDSCHs of the primary transmission packets are described as the methods in Embodiment 1, and are not repeated herein.

For scheduling of a retransmission packet, retransmission supports only single-subframe scheduling, and therefore, the UE may determine the scheduling of the retransmission packet only according to that an NDI is not turned over. In one embodiment, when the NDI is not turned over and SIF='00', the UE determines that scheduling is single-subframe retransmission packet scheduling; and in another embodiment, when the NDI is not turned over, the UE determines that scheduling is sing-subframe retransmission packet scheduling, and in this case, a SIF field may be redundant, for example, may be used as an ARI to indicate an ACK/NACK channel resource.

Determining of an ACK/NACK channel resource of a retransmission packet may be specifically classified into the following scenarios:

(1) When a PDCCH scheduling a retransmission packet is in the same subframe as a PDSCH, that is, scheduling in the same subframe, an ACK/NACK channel resource corresponding to the retransmission packet is corresponding preferably according to a CCE label of the PDCCH, or may reuse an ACK/NACK channel resource of a primary transmission packet corresponding to the retransmission packet, or may be determined through an ARI. In this case, a SIF field may be used as the ARI. An RV field is used as a real retransmission RV version indicator.

(2) When a PDCCH scheduling a retransmission packet is not in the same subframe as a PDSCH, that is, scheduling across subframes, an ACK/NACK channel resource corresponding to the retransmission packet may preferably reuse an ACK/NACK channel resource of a primary transmission packet corresponding to the retransmission packet, or may be determined according to a CCE label of the PDCCH of the retransmission packet, or may be determined through an ARI. In this case, a SIF field may be used as the ARI. An RV field is used as a real retransmission RV version indicator.

In the solution in Embodiment 2, when a retransmission packet is scheduled, a SIF field may be redundant and be used as an ARI, thereby improving the utilization of an ACK/NACK channel resource.

Embodiment 3

In Embodiment 3, multi-subframe scheduling may be primary transmission and may also be retransmission, and primary transmission and retransmission of the multi-subframe scheduling are both determined by a SIF and an NDI.

A base station sends one PDCCH to a UE in a subframe n, where the PDCCH schedules PDSCH primary transmission packets of N subframes of the UE. For example, N may specifically be 1, 2, 3, or 4, but a value of N does not limit the scope of the present invention.

In this case, a SIF of two bits may be added in the PDCCH for indication. Specifically, the UE determines, according to the SIF and an NDI, whether the PDCCH schedules a primary transmission packet or a retransmission packet. In an embodiment of a primary transmission packet, if the NDI is turned over, it indicates primary transmission, and in this case, when the SIF is '00', '01', '10', and '11', it indicates that PDSCH primary transmission packets of subframes {n}, {n, n+1}, {n, n+1, n+2}, and {n, n+1, n+2, n+3} are scheduled. That is, in this case, the SIF that is not equal to '00' indicates scheduling primary transmission packets of multiple subframes. For example, N=3 is taken as an example, and primary transmission packets of three subframes {n, n+1, n+2} are scheduled. In this case, the three PDSCH primary transmission packets adopt a pre-configured RV, for example, RV=0 or 3, or adopt an RV that is notified by the base station through RRC signaling, so that the UE receives the PDSCHs according to the RV. Determining and sending of an ACK/NACK channel resource corresponding to the PDSCHs of the primary transmission packets are described as the methods in Embodiment 1, and are not repeated herein. In an embodiment of a retransmission packet, if the NDI is not turned over, it indicates retransmission, and in this case, when the SIF is '00', '01', '10', and '11', it indicates that PDSCH retransmission packets of subframes {n}, {n, n+1}, {n, n+1, n+2}, and {n, n+1, n+2, n+3} are scheduled, and determining of an ACK/NACK channel resource of a retransmission packet may be specifically classified into the following scenarios:

(1) When a PDCCH scheduling a retransmission packet is in the same subframe as a PDSCH, that is, scheduling in the same subframe, an ACK/NACK channel resource corresponding to the retransmission packet is corresponding preferably according to a CCE label of the PDCCH, or may reuse an ACK/NACK channel resource of a primary transmission packet corresponding to the retransmission packet, or may be determined through an ARI. An RV field is used as a real retransmission RV version indicator.

(2) When a PDCCH scheduling a retransmission packet is not in the same subframe as a PDSCH, that is, scheduling across subframes, an ACK/NACK channel resource corresponding to the retransmission packet may preferably reuse an ACK/NACK channel resource of a primary transmission packet corresponding to the retransmission packet, or may be determined according to a CCE label of the PDCCH of the retransmission packet, or may be determined through an ARI. An RV field is used as a real retransmission RV version indicator.

In primary transmission, in the solution in Embodiment 3, an ACK/NACK channel resource corresponding to a PDSCH in a subframe in which a PDCCH is not located is explicitly indicated through an ARI, thereby reducing a scheduling limitation, and improving scheduling flexibility of a PDCCH. In addition, by reusing a field in an existing PDCCH as an ARI, format design of the PDCCH is simplified. Moreover, in Embodiment 3, multi-subframe scheduling of a retransmission packet and indication of an ACK/NACK resource are further supported.

Figure 4:
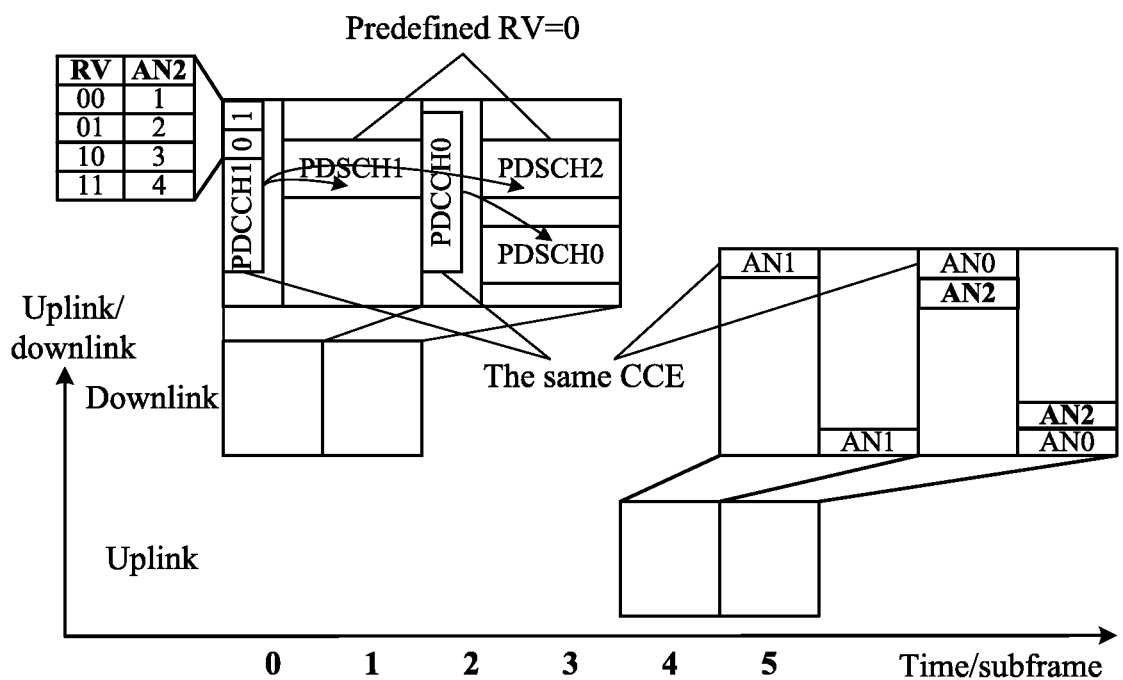
FIG. 4 is a schematic diagram of an example that a PDCCH schedules PDSCHs of multiple subframes according to an embodiment of the present invention.

FIG. 4 is a schematic diagram of an example that a PDCCH schedules PDSCHs of multiple subframes according to an embodiment of the present invention. It should be understood that, as compared with the solution shown in FIG. 1, FIG. 4 helps persons skilled in the art better understand the present invention, but is not intended to limit the scope of the present invention.

As shown in FIG. 4, in a subframe 0, a base station schedules two PDSCHs (PDSCH1 and PDSCH2) of the subframe 0 and a subframe 1 by using a PDCCH1. In the subframe 0 in which the PDCCH1 is located, the PDSCH adopts a pre-configured RV (for example, a predefined RV=0). In this example, a SIF="01"; it indicates that the PDCCH1 schedules two PDSCHs of this frame (that is, the subframe 0) and a next frame (that is, the subframe 1).

In addition, being similar to the solution shown in FIG. 1, in the subframe 1, the base station schedules a PDSCH0 of the subframe 1 by using a PDCCH0.

It can be seen from an ACK/NACK feedback sequence relation that, an ACK/NACK (AN1) corresponding to the PDSCH1 is fed back in a subframe 4, and ACK/NACKs (AN0 and AN2) corresponding to the PDSCH2 and PDSCH0 are fed back in a subframe 5.

According to the solution shown in FIG. 1, if the PDCCH1 and the PDCCH0 occupy the same CCE label, channel resources of the AN0 and AN2 in the subframe 5 conflict, and in this way, an eNB cannot use the same CCE label to schedule the two PDCCHs, thereby bringing in a scheduling limitation on a scheduler. Therefore, the solution shown in FIG. 1 reduces scheduling flexibility of a PDCCH.

However, in the foregoing solution according to the embodiment of the present invention, the PDSCH1 that is in the same subframe as the PDCCH1 is indicated by using the CCE label, and a channel resource corresponding to the PDSCH2 that is not in the same subframe as the PDCCH1 is not indicated by using the CCE label but is indicated by using first indicator information (such as an ARI). Alternatively, ACK/NACKs of multiple PDSCHs in multi-subframe scheduling are all indicated by an ARI. Therefore, channel resources used for feeding back the ACK/NACKs (AN0 and AN2) corresponding to the PDSCH2 and PDSCH0 can be distinguished. Therefore, even the PDCCH1 and the PDCCH0 occupy the same CCE label, the channel resources of the AN0 and AN2 do not conflict, so that it is unnecessary to perform a scheduling limitation on a PDCCH, thereby improving scheduling flexibility of the PDCCH.

Figure 5:
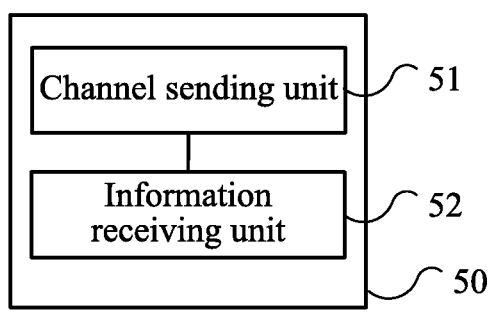
FIG. 5 is a block diagram of a base station according to an embodiment of the present invention.

FIG. 5 is a block diagram of a base station according to an embodiment of the present invention. A base station 50 shown in FIG. 5 includes a channel sending unit 51 and an information receiving unit 52.

The channel sending unit 51 sends a PDCCH to a user equipment in one subframe. The PDCCH is used to schedule transmission of PDSCHs of at least two subframes of the user equipment, the PDCCH carries first indicator information, and the first indicator information indicates a channel resource for transmitting uplink ACK/NACK information that is corresponding to the PDSCHs. The information receiving unit 52 determines a transmission subframe carrying the uplink ACK/NACK information that is corresponding to the PDSCHs, and receives the uplink ACK/NACK information on the channel resource in the transmission subframe.

In the embodiment of the present invention, when a PDCCH schedules multiple PDSCHs, indicator information is carried in the PDCCH to indicate a channel resource of ACK/NACK feedback that is corresponding to the scheduled PDSCHs, so that the channel resource of the ACK/NACK feedback that is corresponding to the multiple PDSCHs can be determined.

The base station 50 may execute steps in the method shown in FIG. 2, and implement the foregoing Embodiment 1 to Embodiment 3, which is not described in detail to avoid repetition.

For example, optionally, as an embodiment, the PDSCH may adopt a pre-configured redundant version (RV). For example, the PDCCH may be used to schedule transmission of primary transmission PDSCHs of at least two subframes of the user equipment. Each subframe is corresponding to at least one primary transmission PDSCH. A pre-configured RV adopted by the primary transmission PDSCH may be pre-defined. That is, the base station and the user equipment do not need to interact with each other. Alternatively, a pre-configured RV adopted by the primary transmission PDSCH may be determined by the base station, and then the base station notifies the user equipment of the pre-configured RV. For example, the base station may notify the user equipment of the pre-configured RV through RRC signaling. A manner of notifying the pre-configured RV is not limited in the embodiment of the present invention.

Optionally, as another embodiment, the PDCCH sent by the channel sending unit 51 may carry SIF information, where the SIF information is used to indicate the at least two scheduled subframes, so that the user equipment may determine, according to the SIF information carried by the PDCCH, a primary transmission PDSCH of which subframe is scheduled by the PDCCH. Alternatively, the PDCCH may carry SIF information and NDI (new data indicator) information, where the SIF information and the NDI information are used to jointly indicate the at least two scheduled subframes, so that the user equipment may determine comprehensively, according to the SIF information and NDI that are carried by the PDCCH, a primary transmission PDSCH of which subframe is scheduled by the PDCCH. For examples of a manner of indicating a scheduled subframe, reference may be made to Embodiment 1 to Embodiment 3.

Optionally, as another embodiment, first indicator information of a channel resource of uplink ACK/NACK information that is corresponding to a PDSCH, in the PDSCHs sent by the channel sending unit 52, that is in the same subframe as the PDCCH, may be a CCE label of the PDCCH. First indicator information of a channel resource of uplink ACK/NACK information that is corresponding to a PDSCH, in the PDSCHs sent by the channel sending unit 52, that is not in the same subframe as the PDCCH, may be an ARI in the PDCCH.

Optionally, as another embodiment, first indicator information of a channel resource of uplink ACK/NACK information that is corresponding to a PDSCH may be an ARI in a PDCCH.

Optionally, the ARI may be a specified bit or a scrambling code in the PDCCH. For example, the specified bit may be all or part of bits in the RV, and/or one bit in the NDI, and/or all or part of bits in a DAI. For examples of the first indicator information, reference may be made to Embodiment 1 to Embodiment 3.

Therefore, in the embodiment of the present invention, when a PDCCH schedules multiple PDSCHs, an ACK/NACK resource indicator field may be used to indicate a channel resource of ACK/NACK feedback that is corresponding to the scheduled PDSCHs, and a subframe indicator field may further be introduced to specifically identify the number of scheduled subframes, so that a redundancy version field and/or new data indicator field may be used as the ACK/NACK resource indicator, thereby improving scheduling flexibility.

Figure 6:
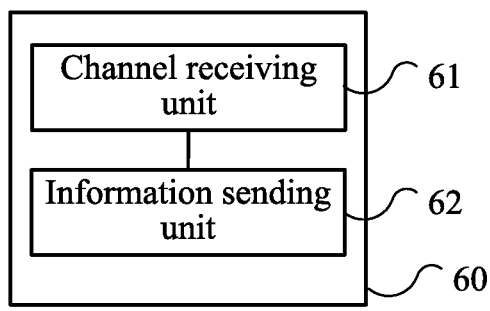
FIG. 6 is a block diagram of a user equipment according to an embodiment of the present invention.

FIG. 6 is a block diagram of a user equipment according to an embodiment of the present invention. A user equipment 60 shown in FIG. 6 includes a channel receiving unit 61 and an information sending unit 62.

The channel receiving unit 61 receives, in one subframe, a PDCCH sent by a base station. The PDCCH is used to schedule transmission of PDSCHs of at least two subframes of the user equipment, the PDCCH carries first indicator information, and the first indicator information indicates a channel resource for transmitting uplink ACK/NACK information that is corresponding to the PDSCHs. The information sending unit 62 determines a transmission subframe carrying the uplink ACK/NACK information that is corresponding to the PDSCHs, and sends the uplink ACK/NACK information on the channel resource in the transmission subframe.

In the embodiment of the present invention, when a PDCCH schedules multiple PDSCHs, indicator information is carried in the PDCCH to indicate a channel resource of ACK/NACK feedback that is corresponding to the scheduled PDSCHs, so that the channel resource of the ACK/NACK feedback that is corresponding to the multiple PDSCHs can be determined.

The user equipment 60 may execute steps in the method shown in FIG. 3, and implement the foregoing Embodiment 1 to Embodiment 3, which is not described in detail to avoid repetition.

For example, optionally, as an embodiment, the PDSCH may adopt a pre-configured redundant version (RV). For example, the PDCCH may be used to schedule transmission of primary transmission PDSCHs of at least two subframes of the user equipment. Each subframe is corresponding to at least one primary transmission PDSCH. A pre-configured RV adopted by the primary transmission PDSCH may be pre-defined, that is, the base station and the user equipment do not need to interact with each other, or a pre-configured RV adopted by the primary transmission PDSCH may be determined by the base station, and then the base station notifies the user equipment of the pre-configured RV. For example, the base station may notify the user equipment of the pre-configured RV through RRC signaling. A manner of notifying the pre-configured RV is not limited in the embodiment of the present invention.

Optionally, as another embodiment, the PDCCH received by the channel receiving unit 61 may carry SIF information, where the SIF information is used to indicate the at least two scheduled subframes, so that the user equipment may determine, according to the SIF information carried by the PDCCH, a primary transmission PDSCH of which subframe is scheduled by the PDCCH. Alternatively, the PDCCH may carry SIF information and NDI (new data indicator) information, where the SIF information and the NDI information are used to jointly indicate the at least two scheduled subframes, so that the user equipment may determine comprehensively, according to the SIF information and NDI that are carried by the PDCCH, a primary transmission PDSCH of which subframe is scheduled by the PDCCH. For examples of a manner of indicating a scheduled subframe, reference may be made to Embodiment 1 to Embodiment 3.

Optionally, as another embodiment, first indicator information of a channel resource of uplink ACK/NACK information that is corresponding to a PDSCH, in the PDSCHs scheduled by the PDCCH received by the channel receiving unit 61, that is in the same subframe as the PDCCH is a control channel element CCE label of the PDCCH. In the PDSCHs scheduled by the PDCCH received by the channel receiving unit 61, first indicator information of a channel resource of uplink ACK/NACK information that is corresponding to a PDSCH, in the PDSCHs scheduled by the PDCCH received by the channel receiving unit 61, that is not in the same subframe as the PDCCH is an ACK/NACK resource indicator ARI in the PDCCH.

Optionally, as another embodiment, first indicator information of a channel resource of uplink ACK/NACK information that is corresponding to a PDSCH may be an ARI in the PDCCH.

Optionally, the ARI may be a specified bit or a scrambling code in the PDCCH. For example, the specified bit may be all or part of bits in the RV, and/or one bit in the NDI, and/or all or part of bits in a DAI. For examples of the first indicator information, reference may be made to Embodiment 1 to Embodiment 3.

Therefore, in the embodiment of the present invention, when a PDCCH schedules multiple PDSCHs, an ACK/NACK resource indicator field may be used to indicate a channel resource of ACK/NACK feedback that is corresponding to the scheduled PDSCHs, and a subframe indicator field may further be introduced to specifically identify the number of scheduled subframes, so that a redundancy version field and/or new data indicator field may be used as the ACK/NACK resource indicator, thereby improving scheduling flexibility.

A communication system according to an embodiment of the present invention may include the base station 50 or the user equipment 60.

In an LTE TDD system, a downlink scheduling grant (DL_grant) includes a downlink assignment index (DAI), where a use purpose of the field is to enable a UE to find whether there is a problem of missing detection of DL_grant in an ACK/NACK feedback window, and in addition, this field is further used for sorting when an ACK/NACK in the feedback window is fed back. In the present invention, a configuring or setting method of the field is described by taking the former use purpose as an example, and once the method is determined, a function such as sorting is correspondingly included. The DAI in the DL_grant may be written as DL_DAI. The ACK/NACK feedback window is also called an ACK/NACK binding window, which refers to a downlink subframe corresponding to an ACK/NACK that is fed back in an uplink subframe.

For example, by taking the TDD uplink and downlink configuration 2 shown in Table 1 as an example, 4, 5, 6, and 8 in the uplink subframe 2 are belong to one feedback window, which indicates that ACK/NACKs corresponding to the four downlink subframes 4, 5, 6, and 8 are all fed back in the uplink subframe 2. Specifically, a value of the DL_DAI adopts an accumulation counting manner, for example, when an eNB schedules three downlink subframes 4, 5, and 6 to a UE by using three DL_grants, DL_DAI values in the three DL_grants are 1, 2, and 3. If the UE only receives the DL_grants corresponding to the subframes 4 and 6 but misses detection of the DL_grant of the subframe 5, the UE finds, by reading DL_DAI fields whose values are 1 and 3 in the two DL_grants, that detection of the DL_grant in which DL_DAI is equal to 2 is missed by the UE, and in this case, even both PDSCHs of the subframes 4 and 6 are received correctly, the UE does not feed back an ACK to the eNB, thereby avoiding an error of losing a data packet of the subframe 5. If the DL_DAI does not exist, the UE does not find missing detection of the DL_grant corresponding to the data packet of the subframe 5, and therefore, if both the PDSCHs of the subframes 4 and 6 are received correctly, the UE feeds back an ACK, which causes that a data packet of a PDSCH of the subframe 5 is lost.

If multi-subframe scheduling is introduced in an LTE system, that is, the number of downlink subframes that can be scheduled by one DL_grant is greater than 1, how to configure a DL_DAI value and how an eNB and a UE perform information interaction through sending and receiving the DL_DAI are problems that need to be solved.

In the embodiments of the present invention, a packet loss problem caused by missing detection of DL_grant in a scenario of multi-subframe scheduling may be solved according to exemplary implementation manners described as follows.

According to an embodiment of the present invention, a base station (for example, an eNB) sends downlink scheduling grant DL_grant information to a user equipment (for example, a UE), where the DL_grant information schedules a PDSCH of at least one downlink subframe, and the at least one downlink subframe belongs to one or multiple feedback windows. In another aspect, a user equipment receives downlink scheduling grant DL_grant information sent by a base station, where the DL_grant information schedules a PDSCH of at least one downlink subframe, and the at least one downlink subframe belongs to one or multiple feedback windows. The user equipment sends feedback information (ACK/NACK information) of the at least one downlink subframe according to the DL_grant information.

Optionally, as an embodiment, further, the DL_grant information does not schedule a PDSCH of another downlink subframe that belongs to the one or multiple feedback windows. That is, for one feedback window, the base station can perform scheduling by using only one piece of DL_grant information.

In this case, the user equipment sends, according to the DL_grant information, feedback information of a corresponding downlink subframe in the one or multiple feedback windows. In this case, the user equipment does not consider a counting function of DA_LAI in the DA_grant information, and the DA_LAI may have another use purpose, as shown in Embodiment 1 to 3.

Specifically, the TDD uplink and downlink configuration 2 shown in Table 1 is taken as an example for description.

(1) An eNB sends one DL_grant to schedule subframes 4 and 6, that is, performs scheduling in one feedback window, and other subframes, that is, subframes 5 and 8, in a feedback window corresponding to a subframe 2 are not scheduled in this feedback period, and therefore, it does not need to count by using DL_DAI. Because, for this feedback window, a UE either receives only the DL_grant or misses detection, a situation of missing detection of a part of the DL_grant does not exist. Therefore, the UE does not analyze the DL_DAI, and if the UE receives the DL_grant, the UE feeds back ACK/NACKs corresponding to the subframes 4 and 6. If the UE does not receive the DL_grant, the UE does not feed back an ACK/NACK, and therefore, no packet loss error occurs.

(2) The eNB sends one DL_grant to schedule subframes 6, 8, and 9, that is, schedules downlink subframes in two feedback windows, and other subframes in the two feedback windows in which subframes 2 and 7 are located are not scheduled in this feedback period. Therefore, it does not need to count by using DL_DAI.

In this implementation manner, the eNB and the UE do not require the DL_DAI to perform counting, and in this case, the DL_DAI may be used as an ACK/NACK resource indicator (ARI) to indicate an ACK/NACK channel resource corresponding to a cross-subframe scheduled PDSCH. The cross-subframe scheduled PDSCH refers to that a DL_grant scheduling the PDSCH is not in the same subframe as the PDSCH.

This implementation manner is simple to implement, and does not require the DL_DAI to count. Moreover, the DL_DAI may be used as an ARI to indicate an ACK/NACK channel resource, thereby improving ACK/NACK resource utilization. In addition, persons skilled in the art clearly know that this implementation manner is not limited to the uplink and downlink configuration 2, and may also be applied to other uplink and downlink configurations similarly. Such applications fall within the scope of the embodiment of the present invention.

Optionally, as another further embodiment, in a case that the at least one downlink subframe belongs to one feedback window, the DL_grant information schedules only a PDSCH of a downlink subframe that belongs to the feedback window. That is, the DL_grant information schedules only a PDSCH of a downlink subframe in one feedback window, but does not schedule a PDSCH of a downlink subframe that belongs to another feedback window.

In this case, the DL_grant information includes a downlink assignment index DL_DAI used to implement a counting function the same as that in the prior art, and a specific counting manner may be counting according to the number of DL_grants for scheduling, and may also be counting according to the number of scheduled downlink subframe or the number of scheduled PDSCHs.

In this case, the user equipment sends, according to the DL_grant information and the DL_DAI, feedback information of the at least one downlink subframe in the feedback window.

Specifically, the TDD uplink and downlink configuration 2 shown in Table 1 is taken as an example for description.

In this implementation manner, one DL_grant cannot schedule subframes in multiple feedback windows, for example, one DL_grant cannot schedule subframes 6, 8, and 9, but can perform scheduling in only one feedback window. For example, an eNB sends a DL_grant1 to schedule subframes 4 and 5 in a feedback window corresponding to an uplink subframe 2, and sends a DL_grant2 to schedule subframes 6 and 8 in the feedback window corresponding to the uplink subframe 2. In this case, DL_DAI in the DL_grant is required for counting. A value of the DL_DAI may be counted according to the number of DL_grants, and may also be counted according to the number of scheduled downlink subframes or scheduled PDSCHs. For example, a value of DL_DAI1 in a DL_grant1 may be 1 (according to the number of the DL_grants) or 2 (according to the number of scheduled subframes or the number of PDSCHs), and a value of DL_DAI2 in a DL_grant2 may be 2 or 4.

This implementation manner is simple to implement, and does not need to modify a counting manner of DL_DAI in an existing system. In addition, persons skilled in the art clearly know that this implementation manner is not limited to the uplink and downlink configuration 2, and may also be applied to other uplink and downlink configurations similarly; and such applications fall within the scope of the embodiment of the present invention.

Optionally, as another embodiment, further, in a case that the at least one downlink subframe belongs to multiple feedback windows, the DL_grant information schedules a PDSCH of the at least one downlink subframe. PDSCHs of other downlink subframes in the multiple feedback windows are scheduled by one or more other pieces of DL_grant information. For different downlink subframes in one feedback window, the base station may perform scheduling by using multiple DL_grants, and may also perform scheduling across multiple feedback windows.

In this case, the base station considers DL_grant scheduling across multiple feedback windows when configuring a value of DL_DAI. Specifically, the base station configures a DL_DAI value in DL_grant information for scheduling one feedback window, on the basis of whether another downlink subframe that is not scheduled by the DL_grant in the feedback window is scheduled by a DL_grant for scheduling another feedback window. When another downlink subframe that is not scheduled by the DL_grant in the feedback window is not scheduled by a DL_grant for scheduling another feedback window, the value of the DL_DAI does not depend on DL_DAI of another DL_grant. That is, the value may be configured separately. In another aspect, when another downlink subframe that is not scheduled by the DL_grant in the feedback window is scheduled by a DL_grant for scheduling another feedback window, the value of the DL_DAI depends on scheduling information of the DL_grant for scheduling another feedback window, where the scheduling information includes the number of downlink subframes in the feedback window that are scheduled by the DL_grant for scheduling another feedback window. Optionally, the another downlink subframe that is not scheduled by the DL_grant in the feedback window is a downlink subframe in the feedback window and is before a downlink subframe that is scheduled by the DL_grant. A specific counting manner of DL_DAI is counting based on the number of currently scheduled PDSCHs in a feedback window corresponding to a subframe, where a DL_grant including the DL_DAI is located in the subframe; or counting based on the number of DL_grants that have scheduled downlink subframes currently in the feedback window.

Correspondingly, the user equipment sends, according to the DL_grant information and the DL_DAI, feedback information of the corresponding downlink subframe in the multiple feedback windows. When feeding back an ACK/NACK, the user equipment considers DL_grant scheduling across multiple feedback windows. That is, needs to consider a configuration rule of the DL_DAI. Specifically, the counting manner of counting according to the number of scheduled PDSCHs in a subframe in a current feedback window is taken as an example for description. If the UE reads that a value of the DL_DAI in the DL_grant is consistent with the total number of downlink subframes that are scheduled in the current feedback window, the UE feeds back the ACK/NACK according to whether a PDSCH received in the current feedback window is correct. If the UE reads that the value of the DL_DAI is inconsistent with the total number of the downlink subframes that are scheduled in the current feedback window, the UE does not feed back the ACK, and specifically, the UE may not feed back any information, or the UE may perform feedback by mapping a code word NACK in an ACK/NACK feedback position of a subframe in which a PDSCH is not received in the feedback window.

Other DL_DAI counting and configuration manners are not excluded. For example, the counting manner of the DL_DAI may also be counting based on the number of currently scheduled PDSCHs in a feedback window corresponding to a subframe, where a DL_grant including the DL_DAI is located in the subframe, plus the number of PDSCHs scheduled by the DL_grant including the DL_DAI in another feedback window.

Figure 7:
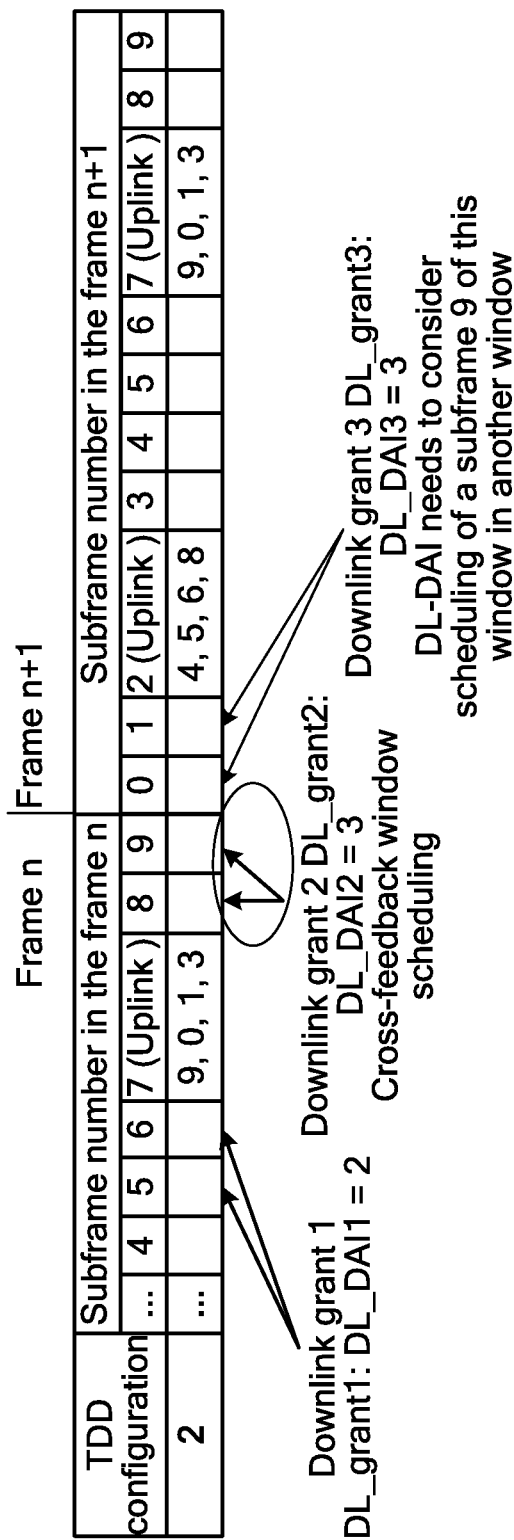
FIG. 7 is a schematic diagram of an example that a DL_grant schedules a PDSCH of a downlink subframe according to an embodiment of the present invention.

Specifically, the TDD uplink and downlink configuration 2 shown in Table 1 is taken as an example for description. FIG. 7 is a schematic diagram of an example that a DL_grant schedules a PDSCH of a downlink subframe according to an embodiment of the present invention.

In the example shown in FIG. 7, one DL_grant may schedule subframes in multiple feedback windows, and different subframes in one feedback window may be scheduled by using multiple DL_grants. Therefore, when configuring a value of DL_DAI, an eNB needs to consider a situation that a DL_grant may perform scheduling across different feedback windows. Specifically, when configuring DL_DAI in a DL_grant in one feedback window, the eNB needs to consider whether another downlink subframe that is not scheduled by the DL_grant in the feedback window is scheduled by a DL_grant for scheduling another feedback window, and correspondingly, when determining ACK/NACK feedback, a UE also needs to use the DAI configuration rule. For example, the eNB sends a DL_grant1 to schedule subframes 5 and 6 in a feedback window corresponding to an uplink subframe 2, sends a DL_grant2 to schedule a subframe 8 in the feedback window corresponding to the uplink subframe 2 and a subframe 9 in a feedback window corresponding to an uplink subframe 7, and sends a DL_grant3 to schedule subframes 0 and 1 in the feedback window corresponding to the uplink subframe 7. In this case, DL_DAIs in the DL_grants are required for counting, specifically, the DL_DAI counting is counting based on the number of PDSCHs that have been scheduled currently in a feedback window corresponding to a subframe, where a DL_grant including the DL_DAI is located in the subframe. For example, a value of DL_DAI1 in the DL_grant1 may be 2, indicating that PDSCHs of two subframes 5 and 6 are currently scheduled in the feedback window. Correspondingly, a value of DL_DAI2 in the DL_grant2 is 3, indicating that PDSCHs of three subframes 5, 6, and 8 are currently scheduled in the feedback window (reference needs to be made to the counting of the DL_DAI1); and a value of DL_DAI3 in the DL_grant3 is 3, because not only PDSCHs of two subframes 0 and 1 currently scheduled by the DL_grant3 need to be included, but also a situation that a subframe 9 of which a time point is before the subframes 0 and 1 in the feedback window and which is scheduled by the DL_grant2 needs to be included.

With this implementation manner, scheduling is flexible and no scheduling limitation exists, and the eNB and the UE configure and analyze the DL_DAI, thereby avoiding packet loss caused by that there is no DL_DAI counting. In addition, persons skilled in the art clearly know that this implementation manner is not limited to a specific scheduling example of the uplink and downlink configuration 2, and may also be applied to other uplink and downlink configurations and/or other scheduling manners similarly. Such applications fall within the scope of the embodiment of the present invention.

According to the foregoing implementation manner, in the embodiment of the present invention, a packet loss problem caused by missing detection of DL_grant in a scenario of multi-subframe scheduling is solved.

Figure 8:
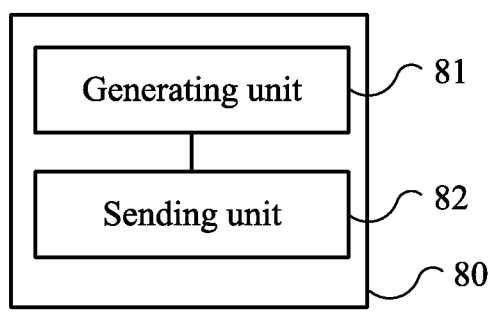
FIG. 8 is a block diagram of a base station according to another embodiment of the present invention.

FIG. 8 is a block diagram of a base station according to another embodiment of the present invention. A base station 80 includes a generating unit 81 and a sending unit 82.

The generating unit 81 generates downlink scheduling grant DL_grant information, where the DL_grant information schedules a PDSCH of at least one downlink subframe, and the at least one downlink subframe belongs to one or multiple feedback windows. Optionally, the DL_grant information does not schedule a PDSCH of another subframe that belongs to the one or multiple feedback windows. Optionally, in a case that the at least one downlink subframe belongs to one feedback window, the DL_grant information schedules only a PDSCH of a downlink subframe that belongs to the feedback window. Optionally, in a case that the at least one downlink subframe belongs to multiple feedback windows, PDSCHs of other downlink subframes in the multiple feedback windows are scheduled by using one or more other pieces of DL_grant information.

The sending unit 82 sends the DL_grant information to a user equipment.

In this way, in the embodiment of the present invention, a packet loss problem caused by missing detection of DL_grant in a scenario of multi-subframe scheduling is solved.

Specifically, in a case that the DL_grant information does not schedule a PDSCH of another subframe that belongs to the one or multiple feedback windows, for one feedback window, the base station can perform scheduling by using only one piece of DL_grant information. As mentioned above, this implementation manner is simple to implement, and does not require DL_DAI to count. Moreover, the DL_DAI may be used as an ARI to indicate an ACK/NACK channel resource, thereby improving ACK/NACK resource utilization.

In addition, in a case that the at least one downlink subframe belongs to one feedback window, the DL_grant information schedules only a PDSCH of a downlink subframe that belongs to the feedback window. That is, the DL_grant information schedules only a PDSCH of a downlink subframe in one feedback window, but does not schedule a PDSCH of a downlink subframe that belongs to another feedback window. In this case, the DL_grant information includes a downlink assignment index DL_DAI used to implement a counting function the same as that in the prior art, and a specific counting manner may be counting according to the number of DL_grants for scheduling, and may also be counting according to the number of scheduled downlink subframe or the number of scheduled PDSCHs. This implementation manner is simple to implement, and does not need to modify a counting manner of DL_DAI in an existing system.

In addition, in a case that the at least one downlink subframe belongs to multiple feedback windows, the DL_grant information schedules a PDSCH of the at least one downlink subframe. PDSCHs of other downlink subframes in the multiple feedback windows are scheduled by one or more other pieces of DL_grant information. For different downlink subframes in one feedback window, the base station may perform scheduling by using multiple DL_grants, and may also perform scheduling across multiple feedback windows. In this case, the base station considers DL_grant scheduling across multiple feedback windows when configuring a value of DL_DAI. With this implementation manner, scheduling is flexible and no scheduling limitation exists, and the eNB and the UE configure and analyze the DL_DAI, thereby avoiding packet loss caused by that there is no DL_DAI counting.

For specific operations of the units of the base station 80, reference may be made to the method embodiment described in the foregoing, and are not described in detail to avoid repetition.

Figure 9:
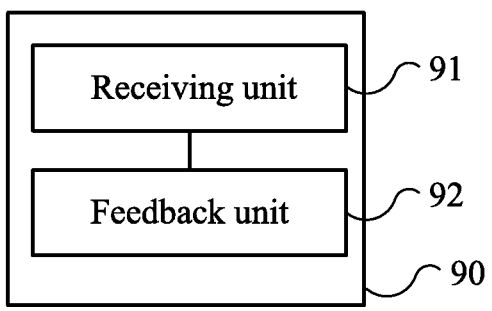
FIG. 9 is a block diagram of a user equipment according to another embodiment of the present invention.

FIG. 9 is a block diagram of a user equipment according to another embodiment of the present invention, and a user equipment 90 shown in FIG. 9 includes a receiving unit 91 and a feedback unit 92.

The receiving unit 91 receives downlink scheduling grant DL_grant information sent by a base station, where the DL_grant information schedules a PDSCH of at least one downlink subframe, and the at least one downlink subframe belongs to one or multiple feedback windows. Optionally, the DL_grant information does not schedule a PDSCH of another subframe that belongs to the one or multiple feedback windows. Optionally, in a case that the at least one downlink subframe belongs to one feedback window, the DL_grant information schedules only a PDSCH of a downlink subframe that belongs to the feedback window. Optionally, in a case that the at least one downlink subframe belongs to multiple feedback windows, PDSCHs of other downlink subframes in the multiple feedback windows are scheduled by using one or more other pieces of DL_grant information.

The feedback unit 92 sends feedback information (ACK/NACK information) of the at least one downlink subframe according to the DL_grant information.

In this way, in the embodiment of the present invention, a packet loss problem caused by missing detection of DL_grant in a scenario of multi-subframe scheduling is solved.

Specifically, in a case that the DL_grant information does not schedule a PDSCH of another subframe that belongs to the one or multiple feedback windows, for one feedback window, the base station can perform scheduling by using only one piece of DL_grant information. In this case, the feedback unit 92 sends, according to the DL_grant information, feedback information of a corresponding downlink subframe in the one or multiple feedback windows. As mentioned above, this implementation manner is simple to implement, and does not require DL_DAI to count, and moreover, the DL_DAI may be used as an ARI to indicate an ACK/NACK channel resource, thereby improving ACK/NACK resource utilization.

In addition, in a case that the at least one downlink subframe belongs to one feedback window, the DL_grant information schedules only a PDSCH of a downlink subframe that belongs to the feedback window. That is, the DL_grant information schedules only a PDSCH of a downlink subframe in one feedback window, but does not schedule a PDSCH of a downlink subframe that belongs to another feedback window. In this case, the DL_grant information includes a downlink assignment index DL_DAI used to implement a counting function the same as that in the prior art, and a specific counting manner may be counting according to the number of DL_grants for scheduling, and may also be counting according to the number of scheduled downlink subframe or the number of scheduled PDSCHs. In this case, the feedback unit 92 sends, according to the DL_grant information and DL_DAI, the feedback information of the at least one downlink subframe in the feedback window. This implementation manner is simple to implement, and does not need to modify a counting manner of DL_DAI in an existing system.

In addition, in a case that the at least one downlink subframe belongs to multiple feedback windows, the DL_grant information schedules a PDSCH of the at least one downlink subframe. PDSCHs of other downlink subframes in the multiple feedback windows are scheduled by one or more other pieces of DL_grant information. For different downlink subframes in one feedback window, the base station may perform scheduling by using multiple DL_grants, and may also perform scheduling across multiple feedback windows. In this case, the feedback unit 92 sends, according to the DL_grant information and the DL_DAI, the feedback information of the corresponding downlink subframe in the multiple feedback windows. When feeding back an ACK/NACK, the feedback unit 92 considers DL_grant scheduling across multiple feedback windows, that is, needs to consider a configuration rule of the DL_DAI. With this implementation manner, scheduling is flexible and no scheduling limitation exists, and the eNB and the UE configure and analyze the DL_DAI, thereby avoiding packet loss caused by that there is no DL_DAI counting.

For specific operations of the units of the user equipment 90, reference may be made to the method embodiment described in the foregoing, and are not described in detail to avoid repetition.

A communication system according to an embodiment of the present invention may include the base station 80 or the user equipment 90.

In an existing non-multi-subframe scheduling TDD system, if a UE receives only a DL_grant for scheduling in one feedback window and DL_DAI in the DL_grant is 1, an ACK/NACK resource requiring feedback in a current feedback window of the UE is corresponding implicitly by using a control channel element (CCE) label occupied by the DL_grant. If the UE receives a DL_grant for scheduling in one feedback window and DL_DAI in the DL_grant is greater than 1, an ACK/NACK resource requiring feedback in the current feedback window of the UE is fed back on an ACK/NACK resource that is configured by using radio resource control (RRC) signaling.

If cross-subframe scheduling is introduced, ACK/NACK resource allocation of scheduling across different feedback windows is a problem to be solved.

The UE receives at least one DL_grant sent by the base station, where the at least one DL_grant schedules transmission of a PDSCH of at least one subframe of the UE.

If the UE determines, according to DL_DAI in the at least one DL_grant, that a PDSCH of only one subframe is scheduled in one feedback window and a first DL_grant for scheduling the PDSCH is sent in the feedback window, the UE feeds back an ACK/NACK in the feedback window on an ACK/NACK channel resource that is corresponding to a control channel element (CCE) label occupied by the first DL_grant.

If the UE determines, according to DL_DAI in the at least one DL_grant, that PDSCHs of more than one subframe are scheduled in one feedback window, the UE feeds back an ACK/NACK in the feedback window on an ACK/NACK channel resource that is configured through an RRC signaling.

How the UE determines, according to the value of the DL_DAI, the number of scheduled PDSCHs in the feedback window is solved by using the solution in the foregoing embodiment.

Optionally, if a DL_grant in a first feedback window schedules both PDSCHs in the first feedback window and a second feedback window, and the UE needs to feed back an ACK/NACK on an ACK/NACK channel resource that is configured through an RRC signaling, the UE feeds back ACK/NACKs corresponding to the first and second feedback windows on the same ACK/NACK channel resource that is configured through the RRC signaling.

Correspondingly, a method at the base station side may be described as follows.

The base station schedules at least one DL_grant to the UE, where the at least one DL_grant schedules transmission of a PDSCH of at least one subframe of the UE.

If the base station determines, according to DL_DAI in the at least one DL_grant, that a PDSCH of only one subframe is scheduled in one feedback window and a first DL_grant for scheduling the PDSCH is sent in the feedback window, the base station receives, on an ACK/NACK channel resource that is corresponding to a control channel element (CCE) label occupied by the first DL_grant, an ACK/NACK that is fed back by the UE in the feedback window.

If the base station determines, according to the DL_DAI in the at least one DL_grant, that PDSCHs of more than one subframe are scheduled in one feedback window, the base station receives an ACK/NACK in the feedback window on an ACK/NACK channel resource that is configured through an RRC signaling.

Optionally, if one DL_grant in the first feedback window schedules both PDSCHs in the first feedback window and the second feedback window, and the base station needs to receive an ACK/NACK on an ACK/NACK channel resource that is configured through an RRC signaling, the base station receives, on the same ACK/NACK channel resource that is configured through the RRC signaling, ACK/NACKs that are corresponding to the first and second feedback windows and are fed back by the UE.

In an embodiment, the TDD uplink and downlink configuration 2 shown in Table 1 is taken as an example for description. It is assumed that a DL_grant1 for scheduling two PDSCHs of subframes 8 and 9 is sent in the subframe 8, and a DL_grant2 for scheduling two PDSCHs of subframes 0 and 1 is sent in the subframe 0, and then, according to a DL_DAI configuration method in the foregoing embodiment, DL_DAI1 in the DL_grant1 is configured to 1, and DL_DAI2 in the DL_grant2 is configured to 3, the UE may determine, according to a values of DL_DAI, that only a PDSCH of the subframe 8 is scheduled in a feedback window corresponding to a subframe 2 and the DL_grant1 for scheduling the subframe 8 is also in the feedback window (in the subframe 8), and therefore, the UE feeds back, on an ACK/NACK channel resource that is corresponding to a CCE label occupied by the DL_grant1, an ACK/NACK in the feedback window corresponding to the subframe 2. The UE may further determine that three PDSCHs are scheduled in a feedback window corresponding to a subframe 7, and the UE feeds back, on an ACK/NACK channel resource that is configured through an RRC signaling, an ACK/NACK in the feedback window corresponding to the subframe 7. The solution reduces an ACK/NACK resource overhead, and keeps backward compatibility of ACK/NACK feedback with respect to an existing system.

In another embodiment, the TDD uplink and downlink configuration 2 shown in Table 1 is taken as an example for description. It is assumed that a DL_grant1 for scheduling two PDSCHs of subframes 4 and 5 is sent in the subframe 4, a DL_grant2 for scheduling two PDSCHs of subframes 8 and 9 is sent in the subframe 8, and a DL_grant3 for scheduling two PDSCHs of subframes 0 and 1 is sent in the subframe 0, and then, according to a DL_DAI configuration method in the foregoing embodiment, DL_DAI1 in the DL_grant1 is configured to 2, DL_DAI2 in the DL_grant2 is configured to 3, and DL_DAI3 in the DL_grant3 is configured to 3, the UE may determine, according to a value of DL_DAI, that 3 PDSCHs are scheduled in a feedback window corresponding to a subframe 2, and further may determine that 3 PDSCHs are scheduled in a feedback window corresponding to a subframe 7. Therefore, the UE needs to feed back, on an ACK/NACK channel resource that is configured through an RRC signaling, ACK/NACKs in the two feedback windows in which the subframe 2 and the subframe 7 are located. The DL_grant2 in the feedback window corresponding to the subframe 2 schedules the subframes (8 and 9) in the two feedback windows at the same time, and therefore, the UE feeds back, on the same ACK/NACK channel resource that is configured through the RRC signaling, ACK/NACKs corresponding to the feedback windows in which the subframe 2 and the subframe 7 are located. The solution is simple to implement, and ACK/NACK channel resource of two feedback windows do not cause that the UE selects a wrong ACK/NACK channel resource due to different ACK/NACK resources that are configured through multiple RRC signaling.

Persons of ordinary skill in the art may be aware that units and algorithm steps in the examples described in the embodiments disclosed in the specification can be implemented by using electronic hardware, or a combination of computer software and electronic hardware. Whether these functions are executed in the form of hardware or software depends upon particular applications and design constraint conditions of the technical solutions. Persons skilled in the art may use a different method to implement the described functions for each particular application, but it should not be considered that such implementation goes beyond the scope of the present invention.

It may be clearly understood by persons skilled in the art that, for the purpose of convenient and brief description, for a detailed working process of the foregoing system, apparatus and unit, reference may be made to a corresponding process in the method embodiments, and details are not described herein again.

In several embodiments provided in the present application, it should be understood that the disclosed system, apparatus, and method may be implemented in other ways. For example, the described apparatus embodiments are only exemplary. For example, the unit division is only logical function division and can be other division in actual implementation. For example, multiple units or components may be combined or integrated into another system, or some features may be ignored or not performed. In addition, the shown or discussed coupling or direct coupling or communication connection may be accomplished through some interfaces, and indirect coupling or communication connection between apparatuses or units may be electrical, mechanical, or in other forms.

Units described as separate components may be or may not be physically separated. Components shown as units may be or may not be physical units, that is, may be located in one position, or may be distributed on multiple network units. Some or all of the units may be selected to achieve the objectives of the solutions in the embodiments according to an actual demand.

In addition, various functional units in the embodiments of the present invention may be integrated in one processing module or may exist as various separate physical units, or two or more units may also be integrated in one unit.

When the functions are implemented in the form of a software functional unit and sold or used as a separate product, the functions may be stored in a computer readable storage medium. Based on such an understanding, the technical solutions of the present invention essentially or the part that makes contributions to the prior art or a part of the technical solutions may be embodied in the form of a software product. The computer software product is stored in a storage medium, and includes several instructions used to instruct a computer device (which may be a personal computer, a server, or a network device) to perform all or a part of steps of the methods described in the embodiments of the present invention. The storage medium includes various media capable of storing program codes, such as, a USB flash disk, a mobile hard disk, a read-only memory (ROM), a random access memory (RAM), a magnetic disk or an optical disk.

The foregoing descriptions are only specific embodiments of the present invention, but are not intended to limit the protection scope of the present invention. Variations and modifications that may be easily figured out by persons skilled in the art within the technical scope disclosed in the present invention all fall within the protection scope of the present invention. Therefore, the protection scope of the present invention shall be subject to that of the claims.

What is claimed is:

1. A communication method, comprising:
   sending a physical downlink control channel (PDCCH) to a user equipment in one subframe, wherein the PDCCH is used to schedule transmission of physical downlink shared channels (PDSCHs) of at least two subframes of the user equipment, the PDCCH carries first indicator information, and the first indicator information indicates a channel resource for transmitting uplink acknowledgment/non-acknowledgment (ACK/NACK) information that is corresponding to the PDSCHs; and
   determining a transmission subframe carrying the uplink ACK/NACK information that is corresponding to the PDSCHs, and receiving the uplink ACK/NACK information on the channel resource in the transmission subframe;
   wherein the first indicator information comprises an ACK/NACK resource indicator (ARI) in the PDCCH, the ARI indicating a channel resource of uplink ACK/NACK information that is corresponding to at least one of the PDSCHs.

2. The communication method according to claim 1, wherein
   the PDCCH further carries subframe indicator field (SIF) information, wherein the SIF information is used to indicate the at least two subframes; or
   the PDCCH further carries SIF information and new data indicator (NDI) information, wherein the SIF information and the NDI information are used to jointly indicate the at least two subframes.

3. The communication method according to claim 1, wherein the at least one of the PDSCHs is not in the same subframe as the PDCCH.

4. The communication method according to claim 1, wherein the ARI is a specified bit or a scrambling code in the PDCCH.

5. The communication method according to claim 4, wherein the specified bit is all or part of bits in a redundancy version, and/or one bit of a new data indicator (NDI), and/or all or part of bits in a downlink assignment index (DAI).

6. A communication method, comprising:
   receiving, in one subframe, a physical downlink control channel (PDCCH) sent by a base station, wherein the PDCCH is used to schedule transmission of physical downlink shared channels (PDSCHs) of at least two subframes of a user equipment, the PDCCH carries first indicator information, and the first indicator information indicates a channel resource for transmitting uplink acknowledgment/non-acknowledgment (ACK/NACK) information that is corresponding to the PDSCHs; and
   determining a transmission subframe carrying the uplink ACK/NACK information that is corresponding to the PDSCHs, and sending the uplink ACK/NACK information on the channel resource in the transmission subframe;
   wherein the PDCCH carries an ACK/NACK resource indicator (ARI) indicating a channel resource of uplink ACK/NACK information corresponding to at least one of the PDSCHs.

7. The communication method according to claim 6, wherein
   the PDCCH further carries subframe indicator field (SIF) information, wherein the SIF information is used to indicate the at least two subframes; or
   the PDCCH further carries SIF information and new data indicator (NDI) information, wherein the SIF information and the NDI information are used to jointly indicate the at least two subframes.

8. The communication method according to claim 7, wherein the at least one of the PDSCHs is not in the same subframe as the PDCCH.

9. The communication method according to claim 7, wherein the ARI is a specified bit or a scrambling code in the PDCCH.

10. The communication method according to claim 9, wherein the specified bit is all or part of bits in a redundancy version, and/or one bit of a NDI, and/or all or part of bits in a downlink assignment index (DAI).

11. The communication method according to claim 6, wherein
    the PDCCH is further used to schedule transmission of a retransmission physical downlink shared channel of one or more subframes of the user equipment, and the PDCCH carries second indicator information used to indicate a channel resource for transmitting uplink ACK/NACK information that is corresponding to the retransmission physical downlink shared channel.

12. The communication method according to claim 11, wherein
    the PDCCH further carries NDI information, wherein the NDI information is used to indicate the one or more subframes; or
    the PDCCH further carries SIF information and NDI information, wherein the SIF information and the NDI information are used to jointly indicate the one or more scheduled subframes.

13. A base station, comprising:
    a channel sending unit, configured to send a physical downlink control channel (PDCCH) to a user equipment in one subframe, wherein the PDCCH is used to schedule transmission of physical downlink shared channels (PDSCHs) of at least two subframes of the user equipment, the PDCCH carries first indicator information, and the first indicator information indicates a channel resource for transmitting uplink acknowledgment/non-acknowledgment (ACK/NACK) information that is corresponding to the PDSCHs; and
    an information receiving unit, configured to determine a transmission subframe carrying the uplink ACK/NACK information that is corresponding to the PDSCHs, and receive the uplink ACK/NACK information on the channel resource in the transmission subframe;
    wherein a channel resource of uplink ACK/NACK information corresponding to a first PDSCH in the PDSCHs is indicated by an ACK/NACK resource indicator (ARI) in the PDCCH.

14. The base station according to claim 13, wherein the PDSCHs adopt a pre-configured redundancy version.

15. The base station according to claim 13, wherein the PDCCH sent by the channel sending unit carries subframe indicator field (SIF) information, and the SIF information is used to indicate the at least two subframes; or the PDCCH sent by the channel sending unit carries SIF information and new data indicator (NDI) information, and the SIF information and the NDI information are used to jointly indicate the at least two subframes.

16. The base station according to claim 13, wherein the ARI is a specified bit or a scrambling code in the PDCCH, and the specified bit is all or part of bits in a redundancy version, and/or one bit of a new data indicator (NDI), and/or all or part of bits in a downlink assignment index (DAI).

17. A user equipment, comprising:

a channel receiving unit, configured to receive, in one subframe, a physical downlink control channel (PDCCH) sent by a base station, wherein the PDCCH is used to schedule transmission of physical downlink shared channels (PDSCHs) of at least two subframes of the user equipment, the PDCCH carries first indicator information, and the first indicator information indicates a channel resource for transmitting uplink acknowledgment/non-acknowledgment (ACK/NACK) information that is corresponding to the PDSCHs; and an information sending unit, configured to determine a transmission subframe carrying the uplink ACK/NACK information that is corresponding to the PDSCHs, and send the uplink ACK/NACK information on the channel resource in the transmission subframe;

wherein uplink ACK/NACK information corresponding to at least one of the PDSCHs is transmitted on a channel resource indicated by an ACK/NACK resource indicator (ARI) carried in the PDCCH.

18. The user equipment according to claim 17, wherein the PDSCHs adopt a pre-configured redundancy version.

19. The user equipment according to claim 17, wherein the PDCCH received by the channel receiving unit carries subframe indicator field (SIF) information, and the SIF information is used to indicate the at least two subframes; or the PDCCH received by the channel receiving unit carries SIF information and new data indicator (NDI) information, and the SIF information and the NDI information are used to jointly indicate the at least two subframes.

20. The user equipment according to claim 17, wherein the ARI is a specified bit or a scrambling code in the PDCCH, and the specified bit is all or part of bits in a redundancy version, and/or one bit of a new data indicator (NDI), and/or all or part of bits in a downlink assignment index (DAI).

* * * * *

UNITED STATES PATENT AND TRADEMARK OFFICE
CERTIFICATE OF CORRECTION

PATENT NO.      : 9,319,199 B2  
APPLICATION NO. : 14/311121  
DATED           : April 19, 2016  
INVENTOR(S)     : Lei Guan Page 1 of 1

It is certified that error appears in the above-identified patent and that said Letters Patent is hereby corrected as shown below:

In the claims

In Col. 28, line 45, claim 12, delete "scheduled".

Signed and Sealed this
Twenty-eighth Day of June, 2016

Michelle K. Lee
*Director of the United States Patent and Trademark Office*